United States Patent [19]

Cusick, III et al.

[11] Patent Number: 4,864,099
[45] Date of Patent: Sep. 5, 1989

[54] WATER COOLED SEMI-AUTOMATIC WELDING GUN

[75] Inventors: Joseph B. Cusick, III, Peck; Kyle Steuart; Dale R. Bervig, both of Wichita, all of Kans.

[73] Assignee: Tweco Products, Inc., Wichita, Kans.

[21] Appl. No.: 27,744

[22] Filed: Mar. 19, 1987

[51] Int. Cl.⁴ .............................................. B23K 9/12
[52] U.S. Cl. ........................... 219/137.62; 219/137.31
[58] Field of Search ....................... 219/136, 74, 137.2, 219/137.31, 137.42, 137.62, 137.63, 137.9

[56] References Cited

U.S. PATENT DOCUMENTS

| | | | |
|---|---|---|---|
| 3,576,423 | 4/1971 | Bernard et al. | 219/136 |
| 3,629,547 | 12/1971 | Kester et al. | 219/137.63 X |
| 4,210,796 | 7/1980 | Moerke | 219/137.63 |
| 4,297,561 | 10/1981 | Townsend et al. | 219/137.63 |
| 4,464,560 | 8/1984 | Church et al. | 219/137.42 |
| 4,600,824 | 7/1986 | Moerke | 219/137.63 |
| 4,667,083 | 5/1987 | Stol | 219/136 |

FOREIGN PATENT DOCUMENTS 2631742 1/1978 Fed. Rep. of Germany ...................... 219/137.62

Primary Examiner—C. L. Albritton
Assistant Examiner—Lincoln Donovan
Attorney, Agent, or Firm—Caruthers, Herzog, Crebs & McGhee

[57] ABSTRACT

A liquid cooled welding gun assembly is adapted to be operatively connected to a power, gas, and weld wire feed mechanism through a cable assembly and a connector assembly. The welding gun assembly includes a front connector block and the connector assembly includes a rear connector block. Power, gas and cooling liquid hoses are contained within the cable assembly and intercommunicate the connector block of the welding gun assembly with the rear connector block. The welding gun assembly includes a liquid cooled nozzle assembly. In an alternative embodiment, a nozzle of the nozzle assembly has an internal cooling passage therein. The nozzle assembly includes alternative diffusers having longitudinally directed gas flow passages therein. A hose coupling assembly is provided for facilitating connecting and disconnecting the various power, gas and liquid hoses from the conductor blocks. In an alternate embodiment, the connector block is replaced by a robotic body and a robotic conductor tube assembly is attached thereto for robotic welding.

21 Claims, 8 Drawing Sheets

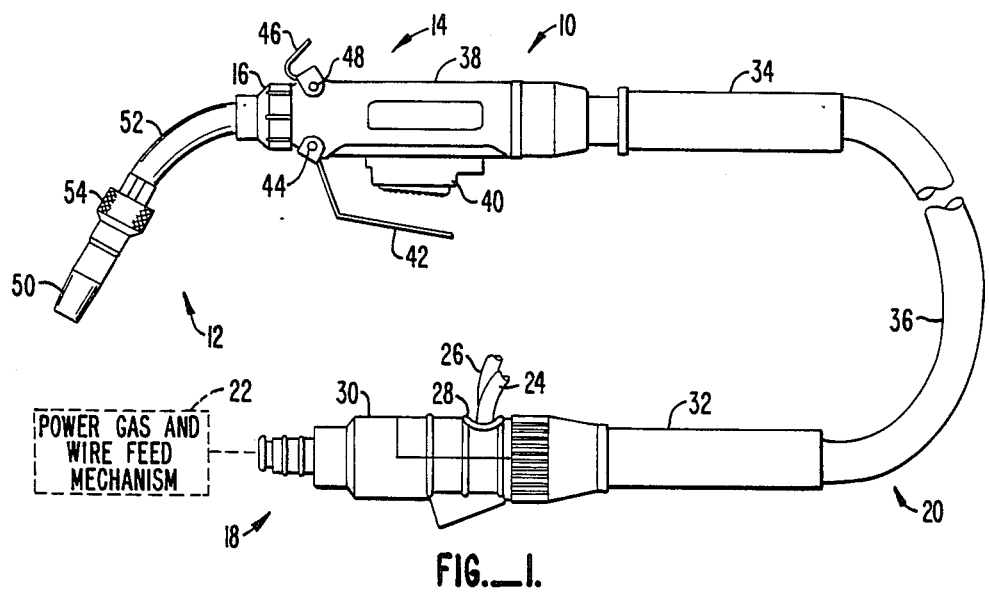
FIG._1.
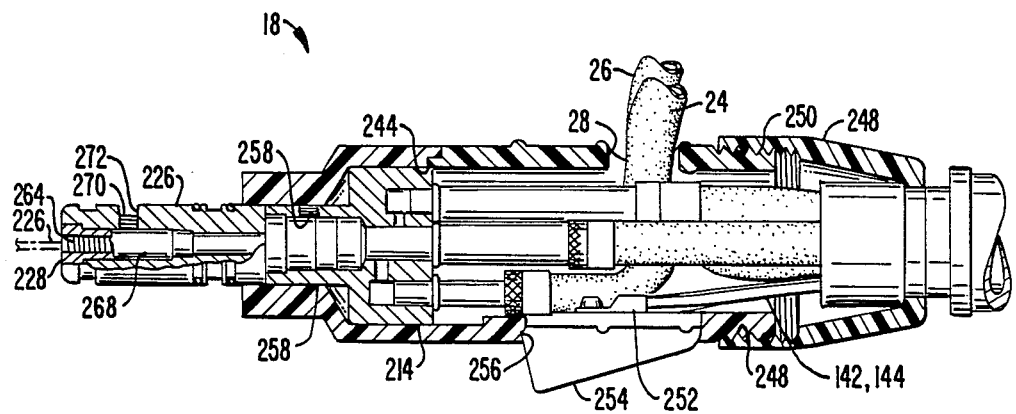
FIG._3.

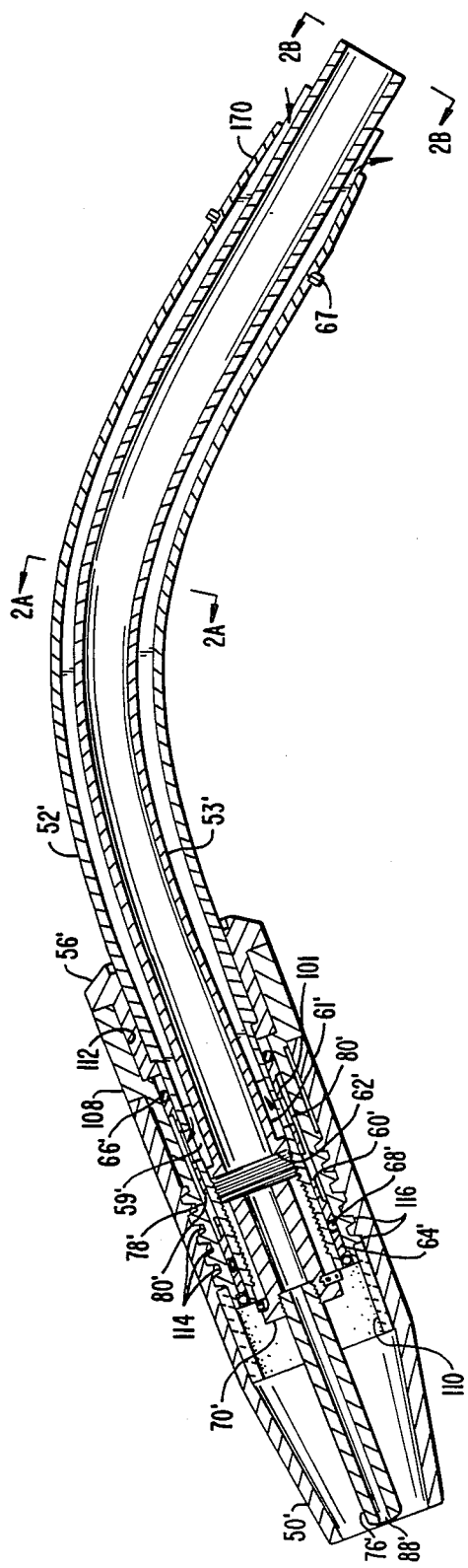
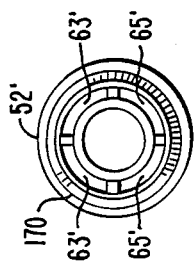
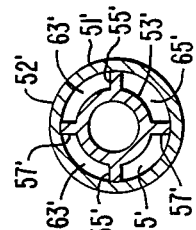

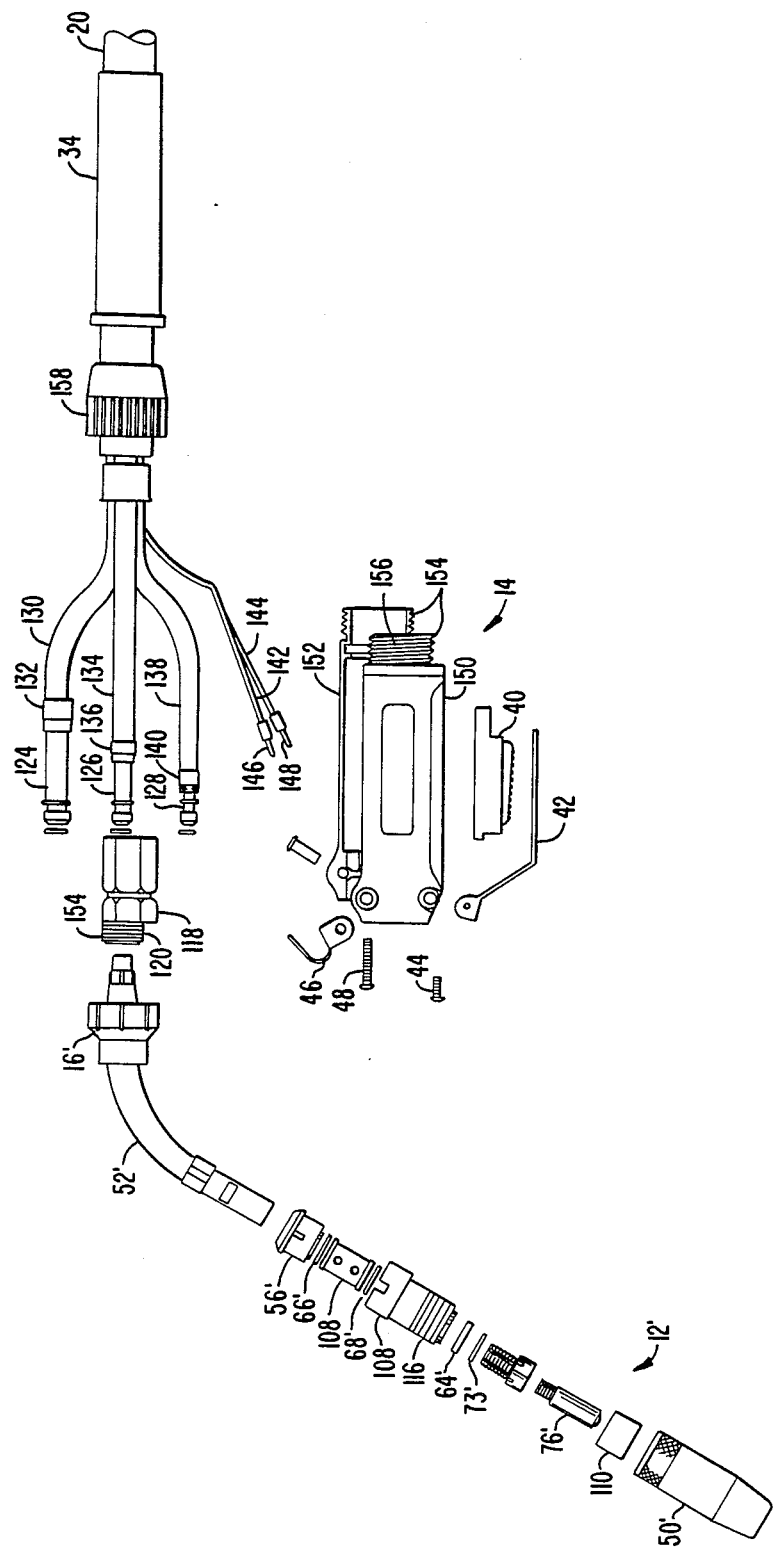
FIG._4.

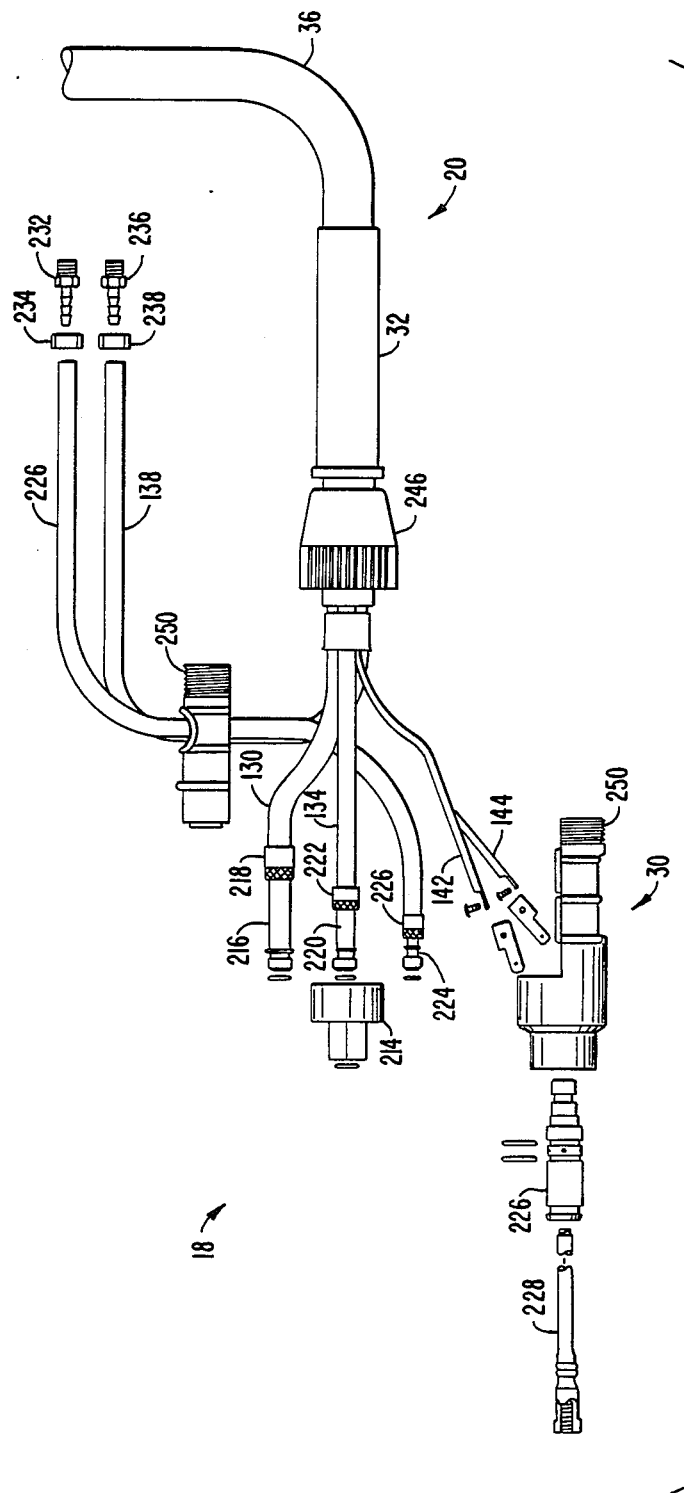
FIG._5.

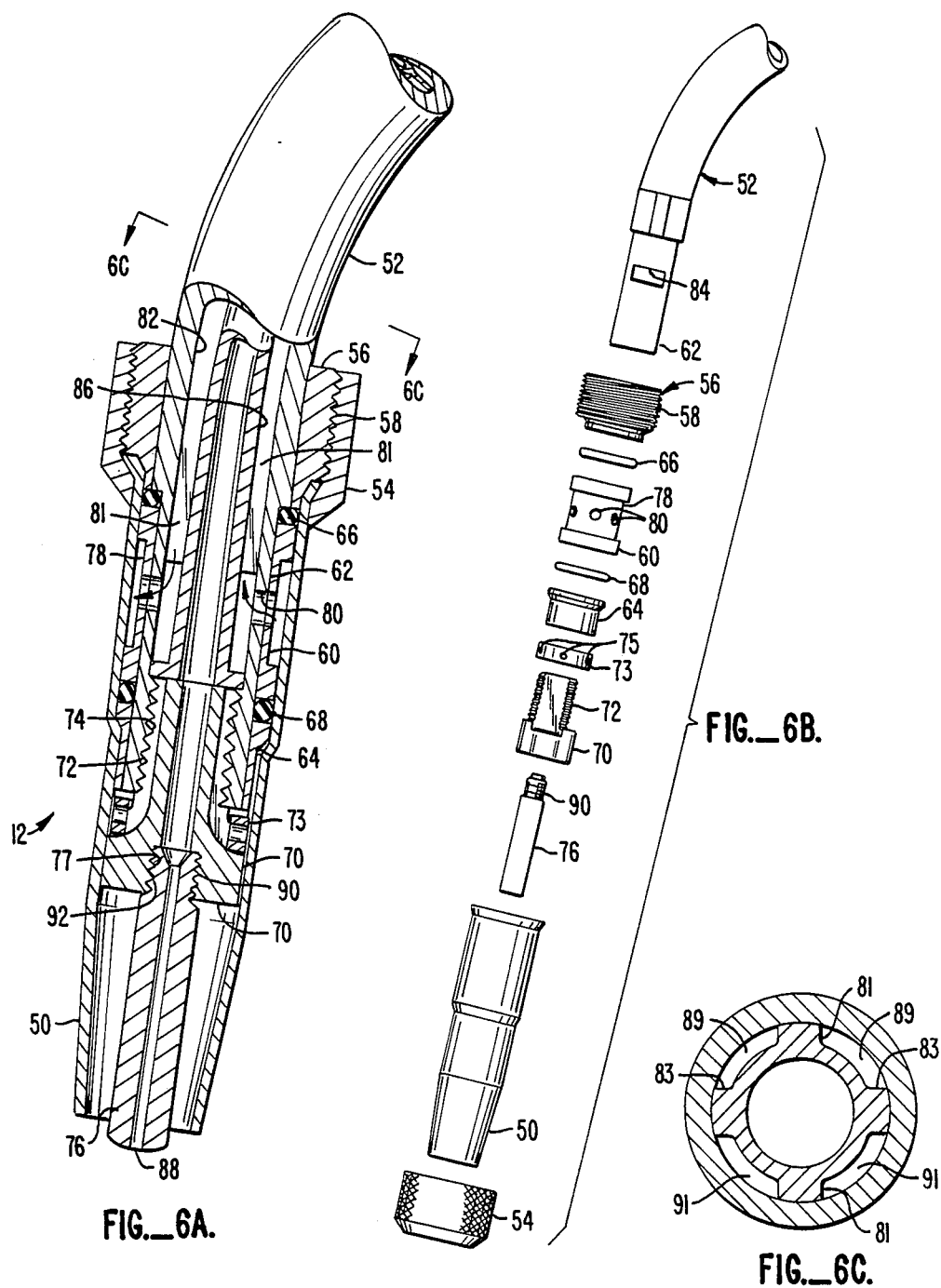

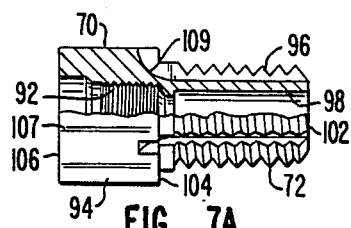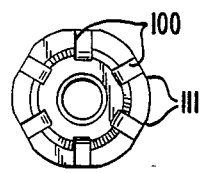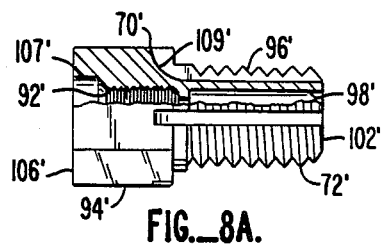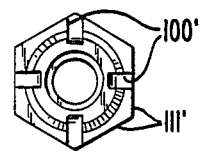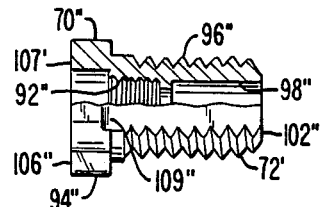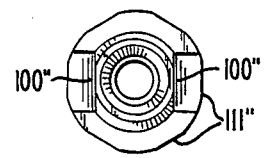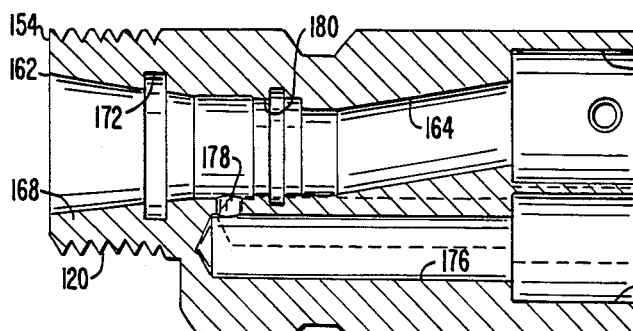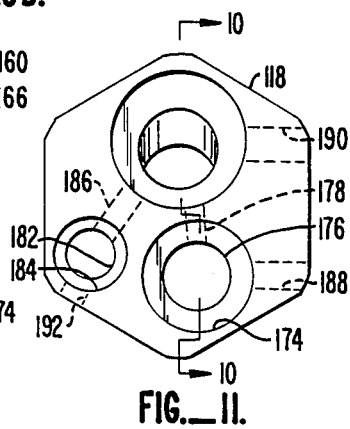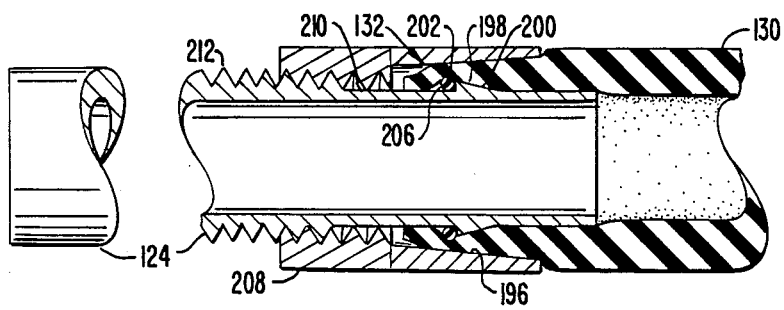

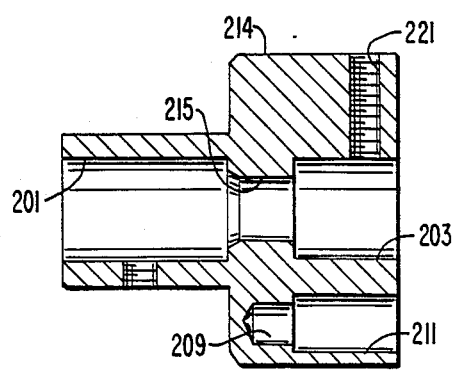
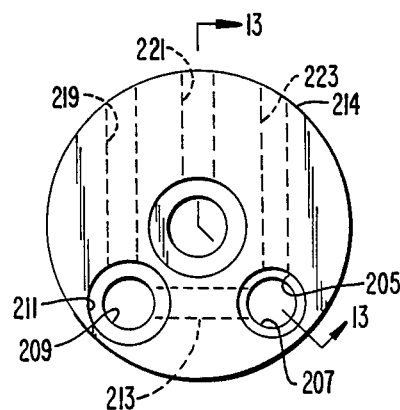
FIG._13.    FIG._14.

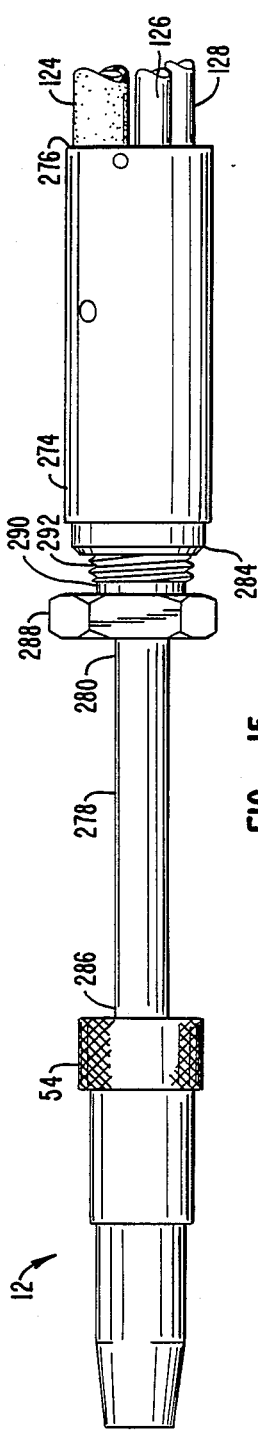
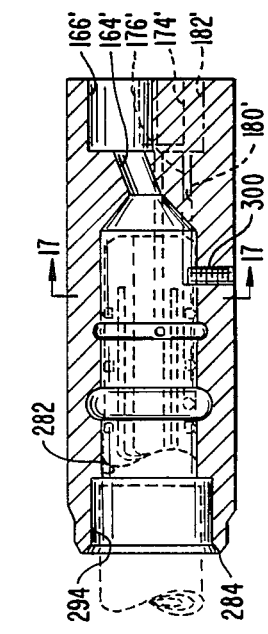
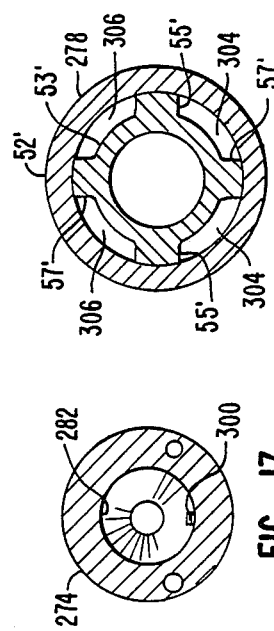
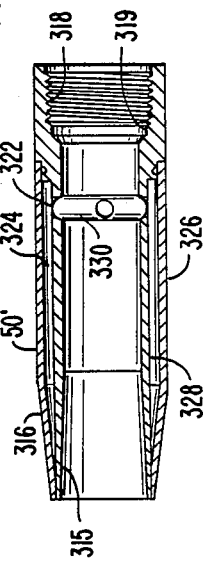
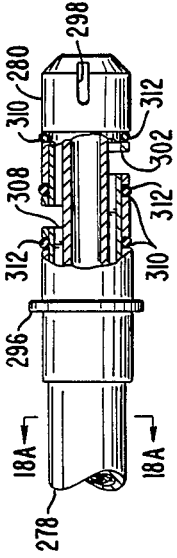

WATER COOLED SEMI-AUTOMATIC WELDING GUN

BACKGROUND OF THE INVENTION

1. Field of the Invention

This invention is directed to a water cooled welding gun assembly. More particularly, it is directed to a water cooled welding gun assembly for controllably supplying weld wire, electrical power, and inert shielding gas to a working area.

2. Description of the Prior Art

This invention is an improvement on applicant's assignee's U.S. Pat. No. 4,297,561 entitled "Semi-Automatic Welding Gun," issued Oct. 27, 1981. That patent describes an air cooled semi-automatic welding gun assembly as contrasted with the water cooled semi-automatic welding gun assembly described and claimed herein.

SUMMARY OF THE INVENTION

The invention takes the form of a water cooled semi-automatic welding gun assembly and associated systems. A welding gun assembly is adapted to be operatively connected to a power, gas and weld wire feed mechanism through a cable assembly and a connector assembly. Parenthetically, while the invention is described in terms of water cooling, it should be understood that any suitable cooling liquid is contemplated to be within the scope of the invention. The welding gun assembly includes a connector block to which various alternative nozzle assemblies may be attached. The connector assembly includes a rear connector block therein. Power, gas and cooling water hoses are contained within the cable assembly and intercommunicate the connector block of the welding gun assembly with the rear connector block of the connector assembly. Alternative gas diffusers are usable with the nozzle assembly. These alternative diffusers have longitudinally directed gas flow passages thereon varying in number. A hose coupling assembly is provided for connecting the gas, power and water hose to the respective connector blocks.

The front end "consumable" parts, e.g. nozzle, nozzle support structure, tip, gas diffuser, diffuser ring, et cetera, are designed to be easily replaced. If the welding gun is inadvertently operated without cooling water, the consumable parts are designed to act essentially as a fuse and fail before the balance of the gun is damaged. In this manner, the operator can easily repair the damaged gun in a very short time.

The front end is designed to provide direct water cooling of the upper nozzle housing which produces lower operating temperatures than that found with air cooled welding guns. This also produces longer lived parts and a consequent cost savings.

In an alternate embodiment, a robotic welding body is provided in lieu of the connector block. A robotic nozzle is connected to the robotic body. The robotic water cooled conductor tube is designed to be rapidly replaced in order to save the operating downtime. This was accomplished by having the conductor tubes plug into the housing which is mounted on the robot. Also, the tubes are keyed for a single position and bent to hit an exacting torque zone. Thus, when the operator changes conductor tubes, the new tube will hit the same target zone as the one it replaced. Still further, an alternative water-cooled nozzle is provided which allows for a 100 percent duty cycle. The water cooled nozzle also remains essentially spatter-free by means of its tapered mouth and cooling.

Other objects and advantages of the invention will become more evident from the following detailed description and accompanying drawings which illustrate a preferred embodiment of the invention.

BRIEF DESCRIPTION OF THE DRAWINGS

FIG. 1 is a side elevation view of the welding gun assembly, cable assembly, and connector assembly;

FIG. 2 is a cross-sectional view of a portion of a first embodiment of the nozzle assembly;

FIG. 2A is a cross-sectional view taken along lines 2A—2A in FIG. 2;

FIG. 2B is a cross-sectional view taken along lines 2B—2B in FIG. 2;

FIG. 3 is a partial cross-sectional view of the connector assembly of FIG. 1;

FIG. 4 is an exploded view of the welding gun assembly of FIG. 1 showing an alternate embodiment of the nozzle assembly;

FIG. 5 is an exploded view of the connector assembly of FIG. 1;

FIG. 6A is an enlarged cross-sectional view of the nozzle assembly of FIG. 1;

FIG. 6B is an exploded view of the nozzle assembly of FIG. 6A, showing details thereof;

FIG. 6C is a cross-sectional view taken along lines 6C—6C in FIG. 6A;

FIG. 7A is a side elevational view in partial cross-section of a first embodiment of a diffuser having six longitudinal gas slots;

FIG. 7B is a right end view of the diffuser of FIG. 7A;

FIG. 8A is a side elevational partial cross-sectional view of a second embodiment of the diffuser of FIG. 7A, having four instead of six longitudinal gas slots;

FIG. 8B is a right end view of the diffuser of FIG. 8A;

FIG. 9A is a side elevational partial cross-sectional view of a second embodiment of the diffuser of FIG. 7A, having two instead of six longitudinal gas slots;

FIG. 9B is a right end view of the gas diffuser of FIG. 9A;

FIG. 10 is a side elevational cross-sectional view of the connector block taken along lines 10—10 in FIG. 11.

FIG. 11 is a right end view of the connector block of FIG. 10;

FIG. 12 is a cross-sectional view of a hose coupling assembly of FIG. 3, showing details thereof;

FIG. 13 is a side elevational cross-sectional view of the rear connector block of FIG. 3 taken along lines 13—13 in FIG. 14;

FIG. 14 is a right end elevational view of the rear connector block of FIG. 13;

FIG. 15 is a side elevational view of a robotic embodiment;

FIG. 16 is a cross-sectional view of the body of the robotic embodiment of FIG. 15;

FIG. 17 is a cross-sectional view taken along lines 17—17 in FIG. 16;

FIG. 18 is a partial side elevational view in partial cross-section of the conductor tube of FIG. 15; and FIG. 18A is an enlarged cross-sectional view taken along lines 18A—18A in FIG. 18;

FIG. 19 is a cross-sectional view of an alternate embodiment of a nozzle showing details thereof.

DETAILED DESCRIPTION OF THE INVENTION

Referring now to the drawings, a welding gun assembly is shown generally at 10. The welding gun assembly comprises a nozzle assembly 12 which is removably attachable to a handle assembly 14 by means of a threaded retaining cap 16. The handle assembly 14 is in turn connected to a connector assembly 18 by means of a cable assembly 20.

Connector assembly 18 is adapted for connection with a source of power, inert shielding gas and a wire feed mechanism, shown in block diagram form at 22. Power, gas and wire are fed through connector assembly 18 to the nozzle assembly 12 is a manner to be more fully described hereinafter. In addition, a water inlet hose 24 and water outlet hose 26 enter through a side port 28 in connector body 30. Electric power, gas, and cooling water are conveyed to welding gun assembly 10 through cable assembly 20 having shields 32, 34 at the ends thereof. A hollow covered cable 36 interconnects shields 32 and 34. The shields 32, 34 are of heavy material such as rubber, having a larger diameter than that of cable 36 in order to provide a means to limit the bending of the cable assembly, and thereby reducing the risk of its rupture. Cable 36 may be of a flexible rubber material.

The handle assembly 14 is comprised of a handle 38 of Nylon or Lexan plastic material having an actuator switch assembly 40 on the underside thereof. The actuator switch assembly is positioned to be grasped by the fingers of an operator when the hand grips the handle 38. A heat shield 42 in the form of a bent piece of strap metal is pivotally attached to the forward end of the handle by means of a screw 44. A metal hanger bracket strap 46 is similarly pivotally mounted to the forward top end of the handle 38 by means of a screw 48. The purpose of this hanger bracket is to allow hanging storage of the gun between use.

Removably mounted to the handle assembly 14 is a nozzle assembly 12 which comprises a nozzle 50 and a conductor tube assembly 52, which are removably connected to handle 14 by means of a threaded collar 54. In this manner, various different nozzle assemblies may be interchanged with the handle.

Turning to FIGS. 6A and 6B, a nozzle assembly 12 is seen to comprise nozzle 50 removably connected to conductor tube assembly 52 by means of an internally threaded collar 54. A thermally non-conductive nozzle insulator 56 of plastic material having threads 58 thereon is press-fitted onto conductor tube assembly 52 intermediate its ends. The spool shaped water manifold 60 is fitted over the cylindrical end 62 of conductor tube assembly 52. A generally annular pressure ring 64 is also fitted over ends 62. A pair of O-rings 66, 68 of resilient material such as rubber are also located on end 62 intermediate nozzle insulator 56 and water manifold 60 on the one hand, and between water manifold 60 and pressure ring 64 on the other hand. The various parts are positioned such that the O-rings are longitudinally compressed thereby expanding radially so as to provide an enhanced seal.

A gas diffuser 70 of thermally and electrically conductive material having external threads 72 thereon is adapted to be threadedly secured within accommodating threads 74 within end 62 of conductor tube assembly 52. A gas diffuser washer 73 intermediate pressure ring 64 and gas diffuser 70 ensures a gas-tight seal. Diffuser ring 73 has a plurality of equally spaced holes 75 therethrough for distributing gas. This diffuser ring 73 is designed to compress at a torque which is lower than the torque capacity of the gas diffuser 70. This protects the diffuser and the threads 72, 74 from being damaged. The diffuser ring being separate from the diffuser allows replacement at a lower cost than replacement of the entire diffuser, as is the case with the diffuser embodiments shown in FIGS. 7A-B and 8A-B, which embodiments do not have a diffuser ring.

A generally elongated hollow contact tip of copper or other thermally and electrically conductive material 76 is threadedly secured within an accommodating bore 77 in the end of gas diffuser 70.

As may be seen, water manifold 60 is a generally spool shaped structure having an annular groove 78 therearound and perforated by a plurality of equally spaced holes or apertures 80. The manifold serves the function of distributing cooling water entering through an annular passage 82 and thence through a plurality of side ports, one of which is shown at 84, back through a second annular passage 86. As best seen in FIG. 6C, integral longitudinal ribs 81, 83 are located on an inner conductor tube. These ribs divide the annular space between the inner conductor tube 85 and outer conductor tube 87. The ribs are fastened to outer conductor tube 87 by soldering or brazing so as to produce a water tight seal. Ribs 81 do not extend the full length of the conductor tube assembly so that inlet water passages 89 are intercommunicated as best seen in FIG. 6A. Similarly, outlet water passages 91 are intercommunicated. In this manner, the nozzle 50 and front end torch parts are cooled.

With particular reference to contact tip 76, it includes an internal bore 88 through which weld wire (not shown) is directed. It is threadedly secured within an end of diffuser 70 by means of external threads 90, which mate with internal threads 92 in a bore in the end of the diffuser.

Turning now to FIGS. 7A and 7B, the diffuser 70 is shown in more detail. As may be seen, the diffuser consists of a generally elongated member having an enlarged head portion 94 and a narrow projecting body portion 96. An internal bore 98 passes through diffuser 70. Peripherally arranged around the exterior of the diffuser are a plurality of evenly-spaced longitudinal slots 100 for gas distribution. Slots 100 extend from the inlet end 102 of gas distributor 70 to the position intermediate the ends of 104, 106 of head 94 and short of the outlet end 107.

The grooves are machined so as to form a curved end portion 109 so as to direct gas flowing along the slots in a radial direction from the head portion 96. In this manner the gas diffuser is self-cleaning. The positioning of the gas diffuser in close proximity to the adjacent cooling chamber decreases its operating temperature and increases its service life. The head portion 96 includes a plurality of exterior flats 111 thereon to enable the diffuser to be screwed into a threaded bore (not shown) for purposes of mounting.

As may be seen in FIGS. 8A and 8B, an alternate embodiment is shown wherein the number of slots is four instead of six. In this embodiment, the like numbered parts are designated by use of a single prime.

In FIGS. 9A and 9B, the number of slots has been reduced to two. Like numbered parts here are designated by double primes.

Turning now to FIG. 4, there is shown an exploded view of a portion of the welding gun assembly of FIG. 1, however with a second embodiment of the nozzle assembly thereon. This nozzle assembly is generally similar to the first embodiment of FIGS. 6A and 6B, with analogous parts designated by use of a prime. In addition to these analogous parts, there is also included a generally cylindrical nozzle housing 108 of plastic material and an annular spatter shield 110.

As perhaps best seen in FIG. 2, nozzle housing 108 is a generally cylindrical member having an internal bore 112 in one end thereof. Internal bore 112 is designed to be fitted over the external cylindrical surface of insulator 56'. The distal end of nozzle housing 108 has a plurality of circumferential grooves 114 thereon defining a plurality of raised rib portions 116 over which nozzle 50' is fitted. Pressure ring 64' is located intermediate the inner wall of nozzle housing 108 and the distal end 62 of conductor tube assembly 52'. The water manifold 78' is located intermediate O-ring 66' and 68'.

As shown in FIG. 2 and in FIG. 2A, conductor tube assembly 52' is made up of a concentric inner conductor tube 51' and an outer conductor tube 53'. Inner conductor tube 53' has a plurality of equally spaced radially directed ribs thereon. Opposite ribs 55' extend the full length of the conductor tube assembly. The remaining ribs 57' extend to a point short of the end 62' of conductor tube assembly 52'. This leaves a pair of openings 59', 61'. Water in inlet passages 63' may thus be joined and mixed prior to exiting through holes 80' in the water manifold 60'. Similarly, heated water exits through opening 61' and thence through outlet passages 65'.

Entry and exit of water from conductor tube assembly 52' is through tapered end 170 of conductor tube assembly 52' as best seen in FIG. 2B. An annular flange 67 facilitates securing of the tapered end 170 in its accommodating fitting having mating passages for inlet and outlet cooling water (not shown).

Returning to FIG. 4, nozzle 50' is adapted to be fitted over spatter shield 110 and ribs 116 on nozzle housing 108. Nozzle 50' is threadedly secured to threads 116 on nozzle housing 108 by means of internal threads 114 within the nozzle. A spool shaped water manifold 101 serves to distribute and receive cooling water by means of one of two sets of equally spaced holes or apertures 80'. A second set of holes or apertures is located around manifold 101. Both sets of holes are equidistant from the ends of the manifold so that cooling flow will still be obtained even if the manifold 101 is mistakenly reversed, end for end. The nozzle assembly 12' is removably connected to a connector block 118. In this manner, various different nozzle assemblies may be interchanged. The connection is achieved by means of internal threads (not shown) within retaining cap 16' mating with external threads 120 on a cylindrical projection 122 of connector block 118. The particular connection thus described is advantageous as it permits the conductor tube assembly 52' and nozzle 50' thereon to be rotated through 360° for precise positioning with respect to the handle 38. The connector block will be more fully described hereinafter. Adapted to be connected to the inlet side of the connector block 118 are a plurality of tubes in the form of a water inlet connector tube 124, a gas and power cable connector tube 126, and a water outlet connector tube 128. The water inlet connector tube 124 is removably connected to a water inlet hose 130 by means of a gas hose coupling assembly 132, as will be more fully described hereinafter.

Similarly, gas and power cable connector tube 126 is connected to gas and power cable hose 134 by means of a power cable connector assembly 136. Still further, water outlet connector tube 128 is connected to water outlet hose 138 by means of water hose coupling assembly 140. The connector block 118 and the various described hoses and connectors are all adapted to be contained within handle assembly 14. Also contained therein are a pair of control wires 122, 144, having spade lugs 146, 148 at the ends thereof adapted to be operatively connected to actuator switch assembly 40 for controlling the operation of the torch.

As may be seen, the handle assembly 14 is comprised of mirror image right and left halves, which are hollow so as to contain the aforementioned components. When the halves are put together, they form a cylindrical protruberance 154 and 154 having external threads 156 thereon. These threads are adapted to mate with internal threads (not shown) within cylindrical strain relief cap 158. By placing the halves together over the components, installing screws 44, 48, and rotatably positioned cap 158 over protruberance 154, a secure handle is obtained.

Turning now to FIGS. 10 and 11, the connector block 118 is seen to have a plurality of internal longitudinally directed passages. The connector block is a generally cylindrical member having inlet 160 and outlet 162 ends. The power cable passage 164 leads from an inlet bore 166 in inlet end 160 to a tapered outlet bore 168. Tapered outlet bore 168 is adapted to receive a similarly tapered end 170 of conductor tube assembly 52', as best seen in FIG. 2.

Returning to FIGS. 10 and 11, an annular internal groove 172 within tapered outlet 168 is adapted to contain an O-ring (not shown) for purposes of sealing. Gas and power cable passage 164 also conducts the gas (in this case, air). Located below and to the left of gas and power cable passage 164, is a pair of stepped water outlet bores 174, 176. A cross passage 178 leads to the intermediate stepped bore portion 180. Similarly, a pair of stepped water inlet bores 182, 184 feed inlet water to bore portion 180 via cross passage 186. It may be noted that water bore 176 has a larger diameter than inlet bore 182 leading from water inlet bore 184, because it is adapted to contain the power cable (not shown). Cross passage 186 is oriented so as to communicate with the inlet opening (not shown) of the conductor tube assembly (not shown). Similarly, cross passage 178 is oriented so as to communicate with the outlet opening (not shown) of the conductor tube assembly (not shown). Threaded set screw bores 188, 190, 192 are included in connector block 118 for purposes of retaining the respective connector tubes (not shown).

FIG. 12 is illustrative of the connection between a connector tube 124 and a gas hose 130 through a hose coupling assembly 132. The key to this coupling arrangement is a tapered sleeve 194 having a rearwardly directed and internal taper 196 that interacts with an annular tapered rim 198, having a rearwardly facing tapered ramp surface 200, and a perpendicular front wall portion 202. In operation, the open end of hose 130 is forced over the cylindrical two-band 204 until it passes over rim 198. A small O-ring 206 of a resilient material may optionally be placed against the front wall portion 202 to enhance sealing. Tapered sleeve 194 is then placed over the two-band and forced in a rearward direction by means of torquing sleeve 208 having internal threads 210, that engage upon threads 212. This serves to compress the hose end between internal taper 196 and rim 198. The reversing of the torquing will allow subsequent removal of the hose from the connector tube 124. To facilitate torquing the external surface of torquing sleeve 208 may be knurled.

Turning now to FIG. 5, there is shown an exploded view of connector assembly 18 connected to cable assembly 20. As shown in this figure, and in FIG. 3, connector assembly 18 comprises a rear connector block 214 which is adapted to be connected to power cable and gas hose 130, power and water return hose 134, and water inlet hose 138 by means of connector assemblies and connector tubes. Particularly, gas hose 130 is connected to gas connector tube 216 by means of gas hose coupling assembly 218. Power and water return connector tube 220 is connected to power and water return hose 134 by means of power and return coupling assembly 222.

As best seen in FIGS. 13 and 14, rear connector block 214 has an outlet bore 201 in the outlet end thereof. Communicating with the outlet bore is an inlet bore 203 which is adapted to contain the gas connector tube (not shown). The bore 201 communicates with the inlet board 203 by means of the channel 215. A pair of stepped water inlet bore 205, 207 are adapted to contain the water inlet connector tube (not shown). In like manner, a pair of stepped water outlet bores 209, 211 are adapted to contain a water outlet connector (not shown). A cross passage 213 intercommunicates the outlet bore 209 between outlet bore 201 and inlet bore 207.

In order to retain the connector tube in rear connector block 214, a plurality of threaded set screw bores 219, 221, 223 are provided for receiving a like number of set screws (not shown).

Turning to FIG. 5, water inlet connector tube 224 is connected to water inlet hose 226b by means of water inlet coupling assembly 226c. Adapted to be fitted into the input end of rear connector block 214 is a connector plug 228 and a conduit stop 230.

Water is supplied through an inlet fitting 232 secured to the hose 226b by means of a retainer band 234 from a water supply source (not shown). In a similar manner, return water passes through hose 138 and outlet fitting 236 secured by retainer band 238 to a dump for expended water (not shown).

The various components, other than the inlet and outlet fittings, are adapted to be contained within the hollow connector body 30. The body comprises a lower body 240 and a mating upper body 242. When the upper and lower body halves are secured together, they are retained in place by a rim 244 and a strain relief cap 246. When the body halves are placed together, strain relief cap 246 may be relatively rotated and advanced so that its internal threads 248 mate with accommodating external threads 250 on the exterior of connector body 30, as best shown in FIG. 3.

With particular reference to this figure, electrical control wires 142, 144 terminate in spade lugs, one of which is shown at 252, on a plug housing 254. Plug housing 254 projects through an aperture 256 on the underside of lower body 240 so as to mate with a control system (not shown).

In similar manner to the torch handle assembly, the connector tubes are secured within the rear connector block 214 by means of individual set screws (not shown). The rear connector block has a projection 258 which abuts with connector plug 226, whereas both are contained within bore 258a within the inlet end of connector body 30.

As may also be seen, a pair of O-rings contained within accommodating grooves on the external surface of connector plug 226 serve to seal the rear end of the body. The generally elongated conduit stop having a coil of wire 264 for guiding weld wire 266 is fitted within a bore 268 passing through connector plug 226. The conduit stop is retained in position by means of a set screw 270 contained within a threaded bore 272. The conduit stop may conveniently be made of nylon or other resilient plastic material.

Turning now to FIGS. 15 through 18A, there is shown a robotic alternate embodiment. Rather than a welding gun, a robotic connector block body 274 has a cylindrical exterior surface, which may readily be grasped by a robotic manipulator arm (not shown) of a robotic welding machine. The inlet end 276 of body 274 contains a plurality of holes for receiving the gas connector tube 124, water inlet connector tube 126, and water outlet connector tube 128, as with the primary embodiment. In this manner the robotic body is interchangeable with the cable assembly and connector assembly of the primary embodiment heretofore described.

The conductor tube assembly 278 has a closed-off proximal end 280 retained within an outlet bore 282 in an outlet end 284 of the body 274. The distal end 286 has a nozzle assembly 12 thereon identical to that shown in FIG. 6A of the primary embodiment. An internally threaded collar 54 releasably secures the nozzle assembly 12 to the conductor tube assembly 278. A nut 288 including a projection 290 having external threads 292 thereon may be threaded into an internally threaded bore 294 within outlet end 284 of body 274. Nut 288 is hollow so as to encompass conductor tube 278 and bear upon annular flange 296, which is shown in FIG. 18.

As shown in FIGS. 16 and 17, a projection in the form of keyway 298 interacts with a set screw 300 which projects into bore 282. In this manner, the connector tube assembly 278 may be properly oriented within bore 282 so that the various cooling liquid flow passages are in register.

As with the primary embodiment, gas and wire are fed through an inlet bore 166' and thence into a power cable passage 164', whence it passes through an internal bore 282 in conductor and supply tube assembly 278. Internal bore 282 extends entirely through conductor tube assembly 278. As may be seen in FIG. 18, the conductor and supply tube assembly is rotated ninety degrees for purposes of clarity. Inlet water enters inlet water bore 174' and thence passes into a stepped water inlet bore 176'. The water then passes through a cross passage 291 and thence into annular groove 293. Cooling water then passes into slot 302 in the distal end 280. As shown in FIG. 18A, water then passes through a pair of extruded passages 304 defined by longitudinally to and through the distal end, where it reaches nozzle assembly 12. Water then returns through return inlet passages 306 to the vicinity of another radially outwardly facing slot 308 which is 180 degrees opposite to the first slot. Passages 304 and 306 are formed by exterior tube 52', interior tube 53' and radially projecting ribs 55' and 57' thereon. As with the primary embodiment, ribs 57' do not extend the full distance to the distal end of the conductor and supply tube assembly so that the liquid flow in the inlet passages 306 is merged prior to entering the nozzle. Similarly, liquid flow exits through outlet passages 304 at their point of merger at the distal end of the conductor and supply tube assembly 278. Water then passes out a second cross passage 295, annular groove 297, whence it passes out water outlet bores 180' and 182'.

A plurality of circumferential grooves 310 on opposite sides of and intermediate slots 302 and 308 contain a plurality of O-rings 312 of rubber or other resilient material for purposes of sealing. In this manner, fluid is not able to directly pass from slot to slot over the exterior surface of conductor tube assembly 278.

Turning now to FIG. 19, an alternate embodiment of the nozzle 50' is shown having cooling capability. The nozzle is of generally tubular hollow construction, having an internal cylindrical bore 315 therethrough. The distal end of the nozzle has an external frustoconical taper 316. Internal threads 318 within the proximal end of the nozzle enable it to be mounted on a nozzle insulator (not shown), and said threads extend to the counterbore 319.

A plurality of equally spaced holes 322 lead to an annular cooling chamber 324 formed between a generally tubular outer nozzle housing 326 an a generally tubular inner nozzle housing 328. A shallow circumferential groove 330 is also formed so as to emcompass holes 322. In this manner, the walls of nozzle 50' may be cooled by circulation of water within cooling chamber 324.

While the invention has been described in conjunction with a preferred embodiment thereof, it will be understood that the description is intended to illustrate and not limit the scope of the invention, which is to be defined by the scope of the appended claims.

We claim:

1. In a welding gun having a conductor tube assembly having inlet and outlet ends, means defining a longitudinal bore through said conductor tube assembly for passage of gas, a gas diffuser mounted adjacent said outlet, said gas diffuser comprising a generally elongated member having an enlarged head portion and a narrow body portion having an inlet end opposite said head portion, said body portion defining a radially outermost cylindrical surface having threads thereon adapted for mounting said diffuser adjacent said outlet, a longitudinal axial bore through said diffuser from said inlet end to an outlet end at the distal end of said head portion, wherein the improvement comprises a plurality of longitudinally directed slots on said radially outermost cylindrical surface extending from said inlet end into said head portion while stopping short of said outlet end whereby gas may be directed from said inlet end longitudinally along said cylindrical surface and thence radially from said head portion.

2. The invention of claim 1 wherein said slots include a curved end portion in said head portion for directing gas flowing in said slots radially of said head.

3. The invention of claim 2 further including a plurality of flats on the exterior of said head portion.

4. The invention of claim 1 wherein the number of longitudinally directed slots is two.

5. The invention of claim 1 wherein the number of longitudinally directed slots is four.

6. The invention of claim 1 wherein the number of longitudinally directed slots is six.

7. A liquid cooled hand held welding gun apparatus for supplying welding wire, electrical power and shielding gas to a working area comprising:
   (a) a connector assembly adapted to be connected to a welding wire feed mechanism, gas supply, liquid supply and a power and control circuit;
   (b) a handle assembly including a trigger mechanism for manual actuation of said welding gun apparatus, and a connector block in said handle assembly;
   (c) a cable assembly interconnecting said connector assembly with said handle assembly for conveying welding wire, shielding gas, electrical power and cooling liquid thereto, said cable assembly including a gas and feed wire conduit, cooling liquid inlet and outlet conduits and power and control conductors;
   (d) a curved elongated conductor tube assembly having first and second ends, said first end removably mounted in said connector block of said handle assembly, said curved conductor tube assembly being radially adjustable 360° about said handle assembly;
   (e) a liquid cooled nozzle assembly removably mounted on said second end of said curved elongated conductor tube assembly, said liquid cooled nozzle assembly including a removable shielding gas diffuser; and
   (f) Said conductor tube assembly conveying said liquid from said connector block to said nozzle assembly for cooling and from said nozzle assembly back to said connector block and also conveying said shielding gas from said connector block to said shielding gas diffuser for shielding;
   (g) Said connector block forming a bore sized to engage said first end of said conductor tube; and
   (h) Means for sealing between said bore of said connector block and said first end of said conductor tube assembly to prevent leakage of said liquid and to prevent commingling of said shielding gas with said liquid.

8. The apparatus of claim 7 wherein said liquid cooled nozzle assembly further includes:
   (a) a removable insulator forming an internal bore sized and configured to slip over the second end of said curved elongated conductor tube assembly;
   (b) a removable water manifold forming a second internal bore sized and configured to slip over the second end of said curved elongated conductor tube assembly and to abut said insulator;
   (c) a nozzle housing removably mounted on said insulator, said nozzle housing forming a third internal bore sized and configured to receive said water manifold; said third internal bore and said water manifold defining a liquid passageway for said cooling liquid;
   (d) seal means to prevent the escape of cooling liquid from said passageway;
   (e) a contact tip removably engaging said shielding gas diffuser, said diffuser removably engaging said nozzle having; and
   (f) a nozzle removably engaging said nozzle housing, said nozzle forming a fourth internal bore having said contact tip positioned therein; said fourth internal bore and said contact tip defining a gas passageway for directing said shielding gas to said working area.

9. The apparatus of claim 7 wherein said curved elongated conductor tube assembly further includes:

(a) an elongated inner conductor tube, to direct said welding wire and said shielding gas;

(b) an elongated outer conductor tube sized and configured to enclose said inner conductor tube and to form an annulus in between the exterior wall of said inner conductor tube and the internal wall of said outer conductor tube;

(c) a plurality of ribs running the length of said annulus to form an inlet conduit for said cooling liquid and an outlet conduit for said cooling liquid;

(d) an outlet port in said outer conductor tube to allow said cooling liquid to exit said inlet conduit;

(e) an inlet port in said outer conductor tube to allow said cooling liquid to enter said outlet conduit; and (f) mounting means for removably attaching said first end of said conductor tube assembly to said connector block.

10. The apparatus of claim 7 and further including a rear connector block positioned in said connector assembly.

11. A liquid cooled welding apparatus for use with a robotic positioning apparatus, said liquid cooled welding apparatus for supplying welding wire, electrical power and shielding gas to a working area comprising:

(a) a connector block assembly to be connected to a welding wire feed mechanism, gas supply, liquid supply and a power circuit;

(b) a removable conductor tube assembly having first and second ends, said first end forming an elongated alignment pin having a keyway therein for proper radial alignment;

(c) said connector block forming an elongated receptacle sized and configured to receive said elongated nose of said conductor tube assembly;

(d) aligning means in said receptacle of said robotic connector block to interact with said keyway of said nose to achieve proper radial alignment;

(e) a removable nozzle assembly mounted on said second end of said conductor tube assembly;

(f) mounting means for removably attaching said first end of said conductor tube assembly to said connector block; and (g) a nozzle assembly removably mounted on said second end of said conductor tube assembly.

12. A liquid cooled welding gun apparatus for supplying welding wire, electrical power and shielding gas to a working area comprising:

(a) a connector assembly adapted to be connected to a welding wire feed mechanism, gas supply, liquid supply and a power and control circuit;

(b) a welding gun assembly including a nozzle assembly for directing shielding gas to a working area;

(c) a cable assembly interconnecting said connector assembly with said welding gun apparatus for conveying welding wire, shielding gas, electrical power and cooling liquid thereto, said cable assembly including a gas and feed wire conduit, cooling liquid inlet and outlet conduits and power and control cables;

(d) said connector assembly includes a rear connector block means for removably attaching said gas and liquid cooling conduits;

(e) said welding gun assembly including a conductor and supply tube assembly;

(f) a connector block means for removably attaching said gas and liquid cooling conduits;

(g) attachment means for removably securing said conductor and supply tube assembly to said connector block means; and (h) said conductor and supply tube assembly having inlet and outlet ends, means defining a longitudinal bore through said conductor tube assembly for passage of gas, a gas diffuser mounted adjacent said outlet, said gas diffuser comprising a generally elongated member having an enlarged head portion and a narrow body portion having an inlet end opposite said head portion, said body portion defining a radially outermost cylindrical surface having threads thereon adapted for mounting said diffuser adjacent said outlet, a longitudinal axial bore through said diffuser from said inlet end to an outlet end at the distal end of said head portion, plurality of longitudinally directed slots on said radially outermost cylindrical surface extending from said inlet end into said head portion while stopping short of said outlet end whereby gas may be directed from said inlet end longitudinally along said cylindrical surface and thence radially from said head portion.

13. The invention of claim 12 wherein said slots include a curved end portion in said head portion for directing gas flowing in said slots radially of said head.

14. The invention of claim 13 further including a plurality of flats on the exterior of said head portion.

15. The invention of claim 12 wherein the number of longitudinally directed slots is two.

16. The invention of claim 12 wherein the number of longitudinally directed slots is four.

17. The invention of claim 12 wherein the number of longitudinally directed slots is six.

18. The invention of claim 17 wherein said body portion comprises a generally tubular inner portion and a generally tubular outer portion, and wherein said chamber is located between said inner and outer portions.

19. A liquid cooled welding gun apparatus for supplying welding wire, electrical power and shielding gas to a working area comprising:

(a) a connector assembly adapted to be connected to a welding wire feed mechanism, gas supply, liquid supply and a power and control circuit;

(b) a welding gun assembly including a nozzle assembly for directing shielding gas to a working area;

(c) a cable assembly interconnecting said connector assembly with said welding gun apparatus for conveying welding wire, shielding gas, electrical power and cooling liquid thereto, said cable assembly including a gas and feed wire conduit, cooling liquid inlet and outlet conduits and power and control cables;

(d) said connector assembly includes a rear connector block means for removably attaching said gas and liquid cooling conduits;

(e) said welding gun assembly including a conductor and supply tube assembly;

(f) a connector block means for removably attaching said gas and liquid cooling conduits;

(g) attachment means for removably securing said conductor and supply tube assembly to said connector block means;

(h) said nozzle assembly including a liquid cooled nozzle having an elongated, generally cylindrical body defining a central axis and inlet and outlet ends, means defining a central bore through said nozzle from said inlet end to said outlet end, mounting means on said inlet end for selectively securing said nozzle on a support tube, an annular cooling chamber within said body located so as to substantially surround said central bore, passage means intercommunicating said cooling chamber with said central bore intermediate said inlet end and said outlet end so that cooling liquid may be transferred into and out of said cooling chamber thereby cooling said nozzle, wherein said passage means comprising a plurality of spaced holes on the interior of said bore.

20. The invention of claim 19 wherein said holes are equally spaced around said groove.

21. A liquid cooled welding gun apparatus for supplying welding wire, electrical power and shielding gas to a working area comprising:
    (a) a connector assembly adapted to be connected to a welding wire feed mechanism, gas supply, liquid supply and a power and control circuit;
    (b) a welding gun assembly including a nozzle assembly for directing shielding gas to a working area;
    (c) a cable assembly interconnecting said connector assembly with said welding gun apparatus for conveying welding wire, shielding gas, electrical power and cooling liquid thereto, said cable assembly including a gas and feed wire conduit, cooling liquid inlet and outlet conduits and power and control cables;
    (d) said connector assembly includes a rear connector block means for removably attaching said gas and liquid cooling conduits;
    (e) said welding gun assembly including a conductor and supply tube assembly;
    (f) a connector block means for removably attaching said gas and liquid cooling conduits;
    (g) attachment means for removably securing said conductor and supply tube assembly to said connector block means;
    (h) said nozzle assembly including a liquid cooled nozzle having an elongated, generally cylindrical body defining a central axis and inlet and outlet ends, means defining a central bore through said nozzle from said inlet end to said outlet end, mounting means on said inlet end for selectively securing said nozzle on a support tube, an annular cooling chamber within said body located so as to substantially surround said central bore, passage means intercommunicating said cooling chamber with said central bore intermediate said inlet end and said outlet end so that cooling liquid may be transferred into and out of said cooling chamber thereby cooling said nozzle, wherein said passage means further comprises a shallow, circumferential groove in said central bore, and wherein said holes are located in said groove.

* * * * *